June 17, 1930.  W. A. GIBBS  1,765,144
TRAP FOR TAKING LIVE ANIMALS
Filed Dec. 24, 1926  4 Sheets-Sheet 1
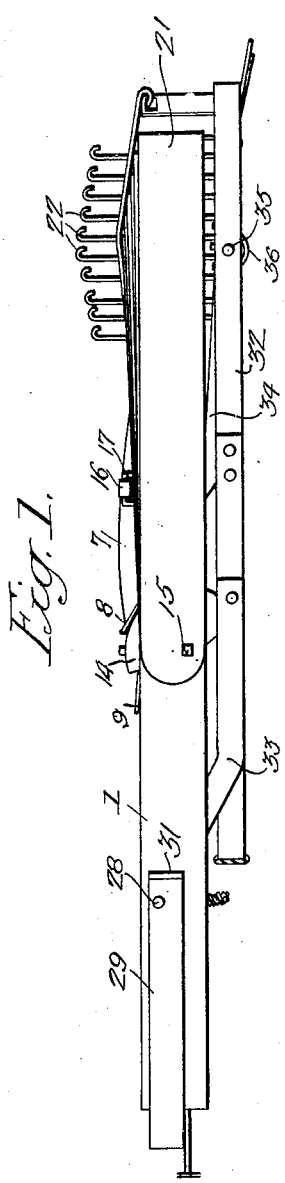
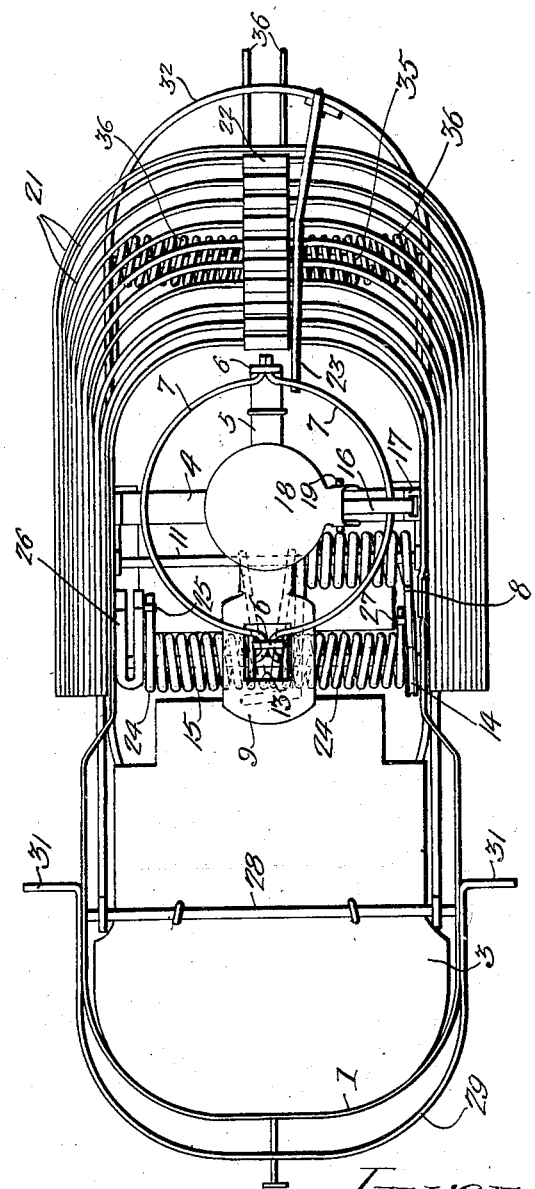
Inventor:
Walter A. Gibbs,
by his Attorneys,
Howson & Howson

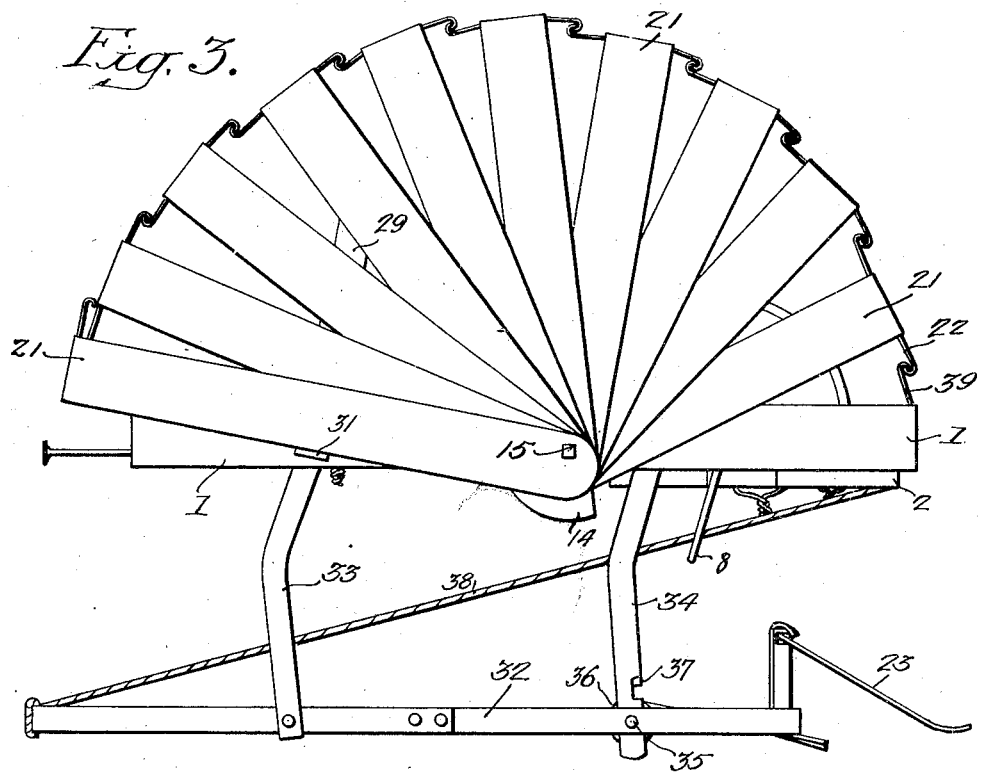
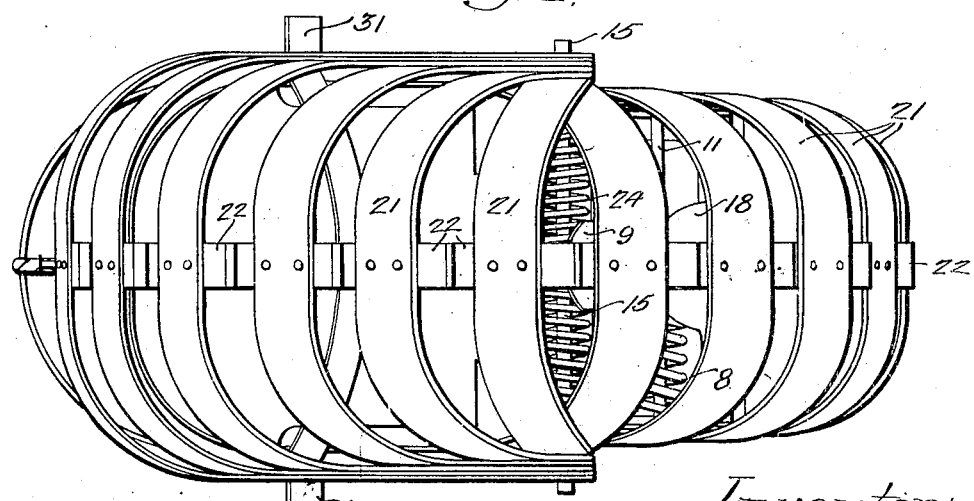

June 17, 1930. W. A. GIBBS 1,765,144
TRAP FOR TAKING LIVE ANIMALS
Filed Dec. 24, 1926 4 Sheets-Sheet 3
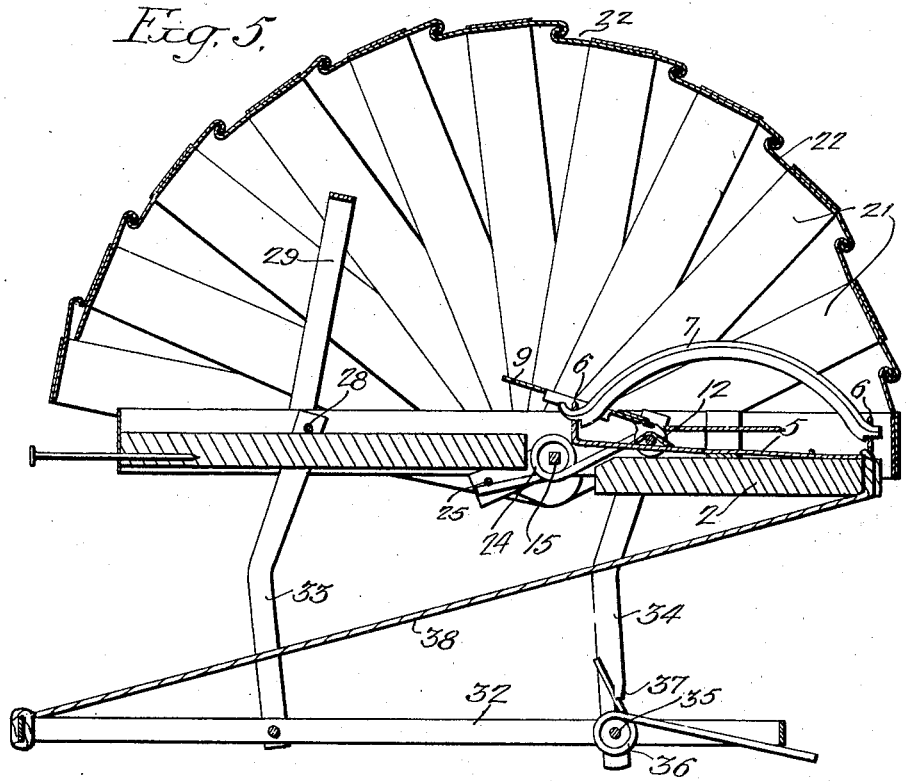
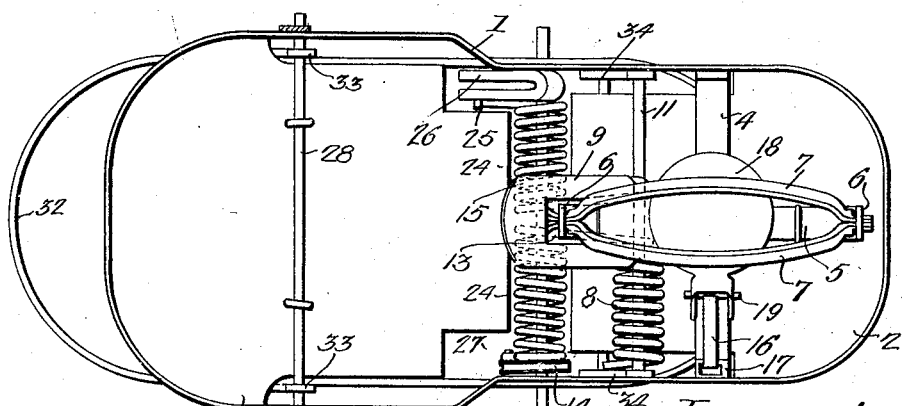
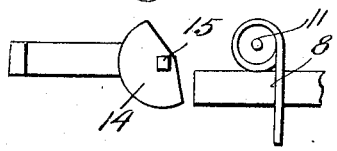
Inventor:-
Walter A. Gibbs
by his Attorneys
Howson & Howson June 17, 1930. W. A. GIBBS 1,765,144
TRAP FOR TAKING LIVE ANIMALS
Filed Dec. 24, 1926 4 Sheets-Sheet 4
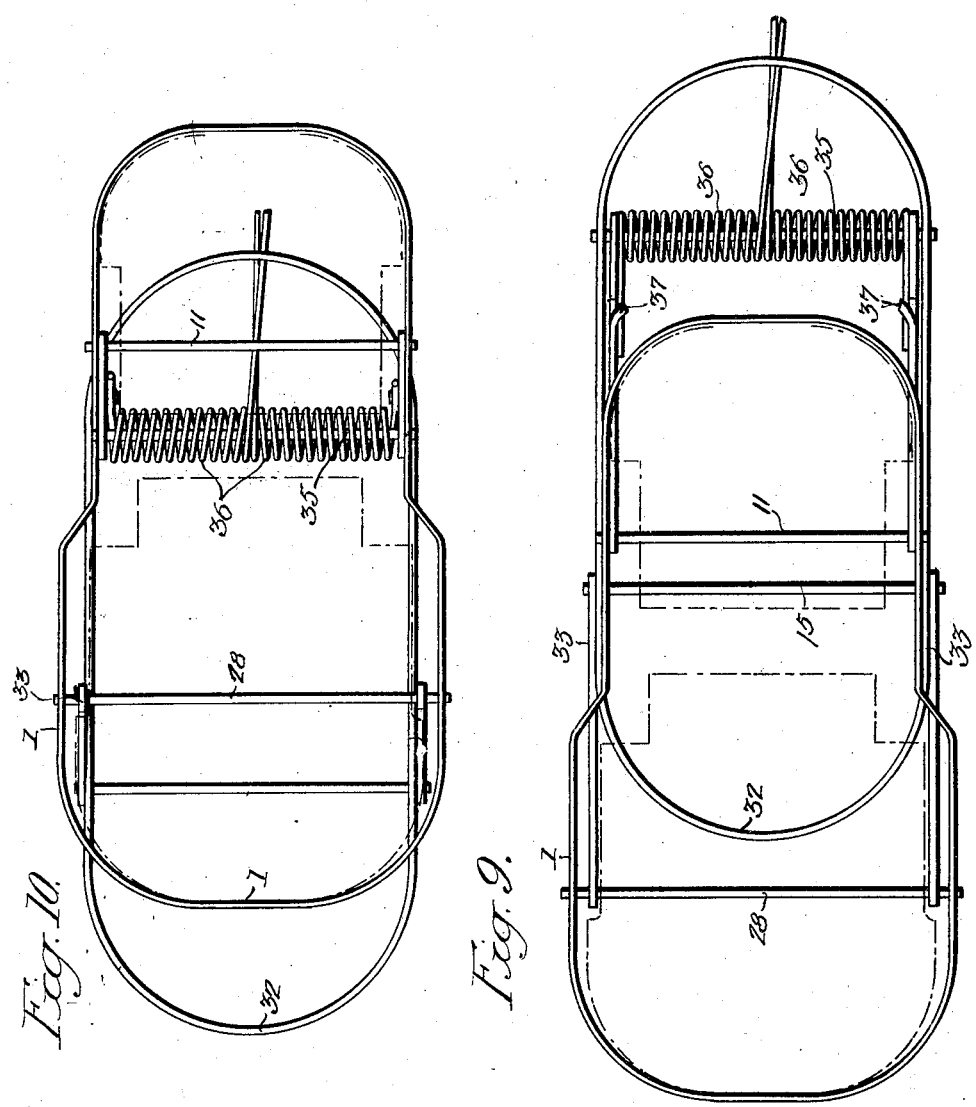

Patented June 17, 1930

1,765,144

UNITED STATES PATENT OFFICE

WALTER A. GIBBS, OF HOLLY OAK, DELAWARE

TRAP FOR TAKING LIVE ANIMALS

Application filed December 24, 1926. Serial No. 156,950.

This invention relates to improvements in animal traps, and the principal object of the invention is to provide a trap of novel and desirable form for taking animals alive.

Another object of the invention is to provide a trap of this type that may be made of a size closely approximating the size of the animal intended to be caught and which for any size of animal may be made exceptionally small and compact.

Another object of the invention is to provide a trap of the stated type so constructed as to render it as easily concealed as any of the common forms of steel trap now in use.

A still further object of the invention is to provide a trap that adapts itself readily to the conditions necessary to successful operation, and to this end the invention contemplates the provision of a modified form of the well known "steel trap" adapted to catch and hold, and thereafter to release the animal following the operation of associated and supplemental means for preventing the animal's escape.

The invention further contemplates the provision of a trap comprising the usual quick acting means for gripping and holding an animal together with supplemental animal-retaining means in the form of a suitably formed cage which is automatically thrown over an animal retained by the primary gripping means.

A further object of the invention is to provide means for preventing the aforesaid cage from closing on the body of the animal held by the aforesaid gripping means or on any portion of the body of said animal not lying within the area normally covered by the cage.

The invention further involves the provision of means automatically operative following actuation of the aforesaid animal-gripping and retaining means to elevate the trapped animal above the water beneath the surface of which the trap may have been set.

In the attached drawings:

Figure 1 is a side elevation of a trap made in accordance with my invention, the trap being in the open or set position;

Fig. 2 is a plan view of the open trap;

Fig. 3 is a side elevation of the trap in the closed and elevated position;

Fig. 4 is a plan view of the closed trap;

Fig. 5 is a longitudinal section of the closed and elevated trap;

Fig. 6 is a plan view of the trap with the cage removed showing the condition of the elements following the closure of the cage;

Figs. 7 and 8 are fragmentary views illustrating the details of the mechanism for releasing the primary holding means following the closing of the cage;

Fig. 9 is an inverted plan view of the trap in the open or set condition, the base of the trap being removed but being indicated in broken lines;

Fig. 10 is an inverted plan similar to Fig. 9 but showing the parts in the positions assumed when the trap is sprung, and Fig. 11 is a fragmentary perspective showing a detail of the trap.

With reference to the drawings, the trap comprises in a preferred embodiment a base consisting of a metal band or strap 1, constituting a frame within which is secured a pair of flat base elements 2 and 3. In the present instance, the base element 2 is secured to and supported in the frame by a cross bar 4 extending transversely across the frame near one end thereof and having its ends secured to the frame by means of rivets or in other suitable fashion.

Secured to the cross member 4 is a bar 5, in the turned-up ends 6 of which is pivotally mounted a pair of cooperating jaws 7, 7 which constitute the primary animal-gripping and holding means. These jaws are actuated or brought together by a spring 8 through the medium of a closing lever 9 of well known form, this lever being pivotally mounted on a rod 11 extending transversely across the frame member 1 and having its ends secured in the latter. In order to reinforce the rod 11, the latter may be passed under a struck-up portion 12 of the member 5, as shown in Fig. 5. The closing lever 9 which has therein an opening 13 embracing one end of the jaws 7, 7, is normally forced upwardly by the spring 8, which spring is supported and retained on the rod 11 and has one end underlying the lever 9, while the other end when the trap is set bears against the grooved peripheral face of a cam 14, as shown in Figs. 2 and 8. The cam 14, the general form of which is shown in Figs. 7 and 8, is secured to a transverse shaft or rod 15 whose ends are journaled in the sides of the frame member 1 and which functions in a manner and for a purpose hereinafter set forth. It will be noted, however, that when the end of the spring 8 rests upon the periphery of the cam 14, as shown in Figs. 2 and 8, a positive pressure is placed upon the under side of the closing lever 9 tending to elevate the latter and bring the jaws 7 together.

The usual latch is provided for holding the jaws 7 in the open position, as shown in Fig. 2. This latch 16 is pivotally secured in the present instance to the upwardly extending end 17 of the cross bar 4 and is adapted to overlie one of the jaws 7 when the said jaws are open. The outer end of the latch 16 fits under a treadle 18 which is pivotally mounted in the present instance at 19 on the cross bar 4 so as to lie centrally of the open jaws 7, as shown in Fig. 2. The treadle when elevated retains the latch 16, which in turn holds the jaws 7 in the open position against the closing pressure of the spring 8. When the treadle is depressed, the jaws are brought smartly together by the spring 8 through the closing lever 9. The general construction of this portion of the trap including the jaws 7 and the associated actuating parts represents a trap of well known type and operation.

The shaft 15 which as stated above carries the cam 14 projects beyond the sides of the frame member 1, and secured to the outer ends of the shaft is a series of substantially U-shaped bands or straps 21 which may be of flexible metal, these bands being of graduated lengths and being arranged on the shafts with the shorter of the bands closest to the frame so that the bands are capable of telescoping as shown in Fig. 2. Each of the bands 21 interlocks with the next smaller and next larger band through the medium of arms 22 on the bands, as shown in Fig. 3, these arms 22 being arranged with reversely hooked ends, as clearly illustrated, so that when the bands are thrown forward from the position shown in Fig. 2 to the position shown in Fig. 3, the arms 22 interlock, the smallest of the bands interlocking with an arm on the frame 1. All of the bands 21 are loosely mounted on the shaft 15 except the outermost and longest, and this is secured and rotates with the shaft. By reason of the character of the interlocking arms 22, the bands may be freely thrown back to the position shown in Fig. 2, and in the normal operation of the trap and when the trap is set, are retained in the thrown back or telescoped position by means of a pivoted latch 23 adapted to overlie the bands 21 and to have its inner end underlie one of the jaws 7 of the primary holding means, as clearly shown in Fig. 2. Obviously with this arrangement the closing of the jaws 7 results in release of the bands 21.

Mounted on the shaft 15 is a pair of springs 24, 24, the inner ends of which overlie the rod 11. The outer end of one of the springs bears against a pin 25 projecting from an arm 26 secured to the shaft 15, the pin and the arm 26 constituting a crank by means of which the shaft may be rotated. The outer end of the other of the springs 24 bears against a pin 27 projecting from the inner face of the cam 14 whereby the cam also constitutes a crank arm on the shaft 15. There is therefore exerted by the springs 24 a constant pressure tending to bring the outermost of the bands 21 from the open position shown in Figs. 1 and 2 to the position shown in Figs. 3 and 4, and this pressure is sufficient when the bands 21 are released to carry the entire set of interlocking bands into the elevated or advanced positions, as shown in Figs. 3 and 4. By reason of the previously described interlock between the bands, the latter are held in the relative positions shown in the drawings, whereby the bands are made to constitute a cage which entirely covers and encloses the base of the trap and the primary holding means which includes the jaws 7, 7.

It will be noted that as the shaft 15 rotates to carry the bands 21 into the cage forming position, the cam 14 is rotated to such an extent that the projecting end of the spring 8 which normally bears against the periphery thereof is released. In Fig. 8, the spring 8 is shown in the normal position bearing on the cam 14, while Fig. 7 shows the cam rotated to the spring-releasing position.

It will be apparent that when the spring 8 is released from the cam 14, the pressure normally exerted against the closing lever 9 by the spring is immediately relieved whereby the closing lever will drop by gravity and release the jaws 7 and the animal held between these jaws. This release of the jaws 7 is, however, timed with relation to the closing of the cage so that the primary trap is not released until the cage has been closed sufficiently to insure retention of the animal. In resetting the trap after closing, the end of the spring 8 is again passed over the periphery of the cam 14 to once more apply pressure of the spring 8 upon the closing lever 9.

The base member 3 is supported in position between the sides of the frame 1 by means of a rod 28 extending transversely across the frame 1 and projecting beyond the frame to pivotally support on its ends a U-shaped member 29 having at its ends flanges 31, 31 which project outwardly from the sides of the frame. These flanges 31 are engaged by the largest of the bands 21 when the latter moves into the cage-forming position. Normally the member 29 lies in the position shown in Figs. 1 and 2, and when the said band 21 strikes the flanges 31, there is a tendency for the pressure to elevate the member 29 around its pivot into a position shown in Fig. 5. The function of this member is to prevent the cage from closing entirely on an animal caught in the jaws 7, 7 whose body does not lie entirely within the area covered by the cage. Under these circumstances, the cage is prevented from entirely closing by the flanges 31, but when the animal draws into the cage, which he has a natural tendency to do, so that the projecting part of his body no longer covers the outer end of the member 29, the latter will be carried into the elevated position permitting the cage to close entirely as shown in Fig. 3.

The trap comprises under the main frame a pedestal consisting of an oval frame 32 having at each side and pivotally secured thereto legs 33, 33 and 34, 34. The legs 33 are pivotally secured to the rod 28, while the legs 34 are pivotally attached to the rod 11. On the cross bar 35 of the frame 32 to which the legs 34 are also pivotally connected is mounted a pair of coiled springs 36 one end of which lies under the end of the frame 32, while the other end engages in back of projecting ears 37 on the legs 34, as shown in Fig. 5.

The frame 32 and the legs 33 and 34 are adapted to be folded close under the base of the trap, as shown in Fig. 1, and the springs are so arranged that they tend to swing the base and pedestal into the relative positions shown in Fig. 5. To limit this movement of the parts under the action of the springs 36, I attach a cord or cable 38 to one end of the base section 2, as shown in Fig. 5, while the other end is attached to the opposite end of the frame 32. Where the frame 32 is the supporting member, the base of the trap and the entire cage with a confined animal is shifted into an elevated position. As shown in Fig. 3, the latch 23 is pivotally secured to the frame member 32 so that the latch when the trap is set as shown in Fig. 2 functions not only to hold the cage elements or bands 21 in the retracted position, as previously described, but also holds the pedestal in the folded-up position. Immediately upon release of the latch 23, which results from the closing of the jaws 7, the springs 36 are permitted to elevate the base frame 1 with its associated parts into a position shown in Fig. 3.

The operation of the trap will be apparent from the foregoing description. The trap is set by folding up the pedestal 32 and turning back the cage elements 21 as shown in Figs. 1 and 2. The parts are maintained in this position temporarily by means of the latch 23 which, after being passed over the elements 21, may be inserted in a suitably formed notch or recess 39, see Figs. 3 and 11, in one edge of the retaining element 22 connected to the frame 1. The operator's hands are then free to set the primary trap and to bring the end of the spring 8 to the top of the cam 14. The latch 23 is then released from the recess 39 and is held in the cage and pedestal retaining position by the jaw 7, as shown in Fig. 2. The member 29 is in the normal depressed position, as shown in Figs. 1 and 2. An animal releasing the primary trap by pressure on the treadle 18 is immediately caught and held by the jaws 7. At the same time the cage is spread over the animal and engages the flanges 31 of the member 29. If any part of the animal extends beyond the end of the frame 1, it will overlie the member 29 and prevent the latter from elevating, thereby preventing the cage from closing on the body of the animal which might prevent the animal from drawing inside the cage or cause injury to an extent resulting in death. The natural tendency of the animal will be to draw into the cage, which results in release of the member 29, which then is elevated to permit the cage to completely close. As the cage approaches the closing position, the cam 14 has turned to an extent releasing the contacting end of the spring 8, as shown in Fig. 7, thereby relieving the pressure in back of the closing lever 9 and permitting the jaws 7 to part, thus freeing the animal which, however, is retained within the cage. Release of the animal in this manner prevents him from struggling or biting at the part held between the jaws 7 and prevents injury and possible death due to these causes.

Research has shown that fur animals naturally inhabitating water cannot endure submergence for any very considerable length of time as the fur evidently becomes water soaked and the animal chilled, causing death. Also where a trap of this character is set submerged to a depth that would retain the animal entirely under the surface of the water, it is necessary to provide means for raising the trap to a point where the animal can get air. As previously described release of the primary trap and of the cage elements also results in release of the elevating apparatus 32—33—34—36, with the result that the frame 1 including the cage and the trapped animal are elevated bodily above the surface of the water in which the trap may have been set.

The foregoing operation results as will be apparent in the capture of the animal alive and in good condition.

I claim:

1. In an animal trap, the combination with means for gripping and holding an animal, of means automatically operative for releasing the gripped animal.

2. In an animal trap, the combination with means for gripping and holding an animal, of means for releasing the gripped animal at a predetermined time subsequent to the initial actuation of said gripping means.

3. In an animal trap, the combination with a set of animal-gripping jaws, of means for actuating said jaws to grip an animal, and means automatically operative following the initial actuation of said jaws for releasing said jaws from the gripped animal.

4. In an animal trap, the combination with a set of animal-gripping jaws, of spring actuated means for bringing the jaws together to grip an animal, and means automatically operative following the initial actuation of said jaws for relieving the spring pressure to permit the jaws to separate.

5. In an animal trap, the combination with a set of animal-gripping jaws, of a spring adapted normally to exert a pressure tending to hold said jaws together, means for holding said jaws in separated position against the pressure of said spring, and means automatically operative for relieving the spring pressure following the initial actuation of the jaws by said spring.

6. In an animal trap, the combination with a set of animal-gripping jaws, of a spring normally exerting a pressure tending to bring the jaws together, an element adapted to support the spring in pressure-exerting condition with respect to said jaws, and means for automatically shifting said spring-supporting member following an initial actuation of the jaws by said spring to a non-supporting position with respect to said spring whereby the pressure of the spring on the jaws is released.

7. In an animal trap, the combination with a set of animal-gripping jaws, of spring means for bringing the jaws together to grip an animal and for retaining the jaws in the animal-gripping position, a rotary element supporting the spring in pressure-exerting position with respect to said jaws, and means automatically operative to rotate said supporting member so as to relase the spring following an initial actuation of the jaws by the latter whereby after said actuation the spring pressure on the jaws is released.

8. In an animal trap, the combination with a set of animal-gripping jaws, of a spring normally exerting a pressure tending to bring the jaws together and to retain the jaws in the closed position, a member operatively associated with the spring to tension the latter with respect to the jaws, and a second spring operatively associated with said tensioning means and adapted when released by an initial actuation of the jaws by the first-named spring to destroy the operative connection between the tensioning means and the jaw-actuating spring whereby the pressure of said spring on the jaws is relieved.

9. In an animal trap, the combination with a set of animal-gripping jaws, of a spring adapted normally to exert a pressure tending to bring the jaws together, a rotary shaft, means carried by said shaft for tensioning the said spring with respect to the jaws, and means automatically operative following an initial actuation of said jaws by the spring for rotating the shaft to release the spring from said tensioning means whereby pressure on said jaws is relieved.

10. In an animal trap, the combination with a set of animal-gripping jaws, of a spring adapted to exert a pressure tending to bring said jaws together, means for tensioning the spring with respect to the jaws, and means for adjusting the tensioning means with respect to the spring following an initial actuation of the jaws by the latter to relieve the pressure of the spring upon the jaws.

11. In an animal trap, the combination with means for gripping and holding an animal, of means for encaging the animal and means for automatically actuating said engaging means following actuation of said gripping and holding means.

12. In an animal trap, the combination with a set of animal-gripping jaws, of a cage, means for actuating the jaws, and means for automatically bringing the cage into a position to enclose the animal held by said jaws.

13. In an animal trap, the combination with means for initially gripping an animal, of an articulated cage structure normally held in a position avoiding obstruction of said gripping means, means for actuating the gripping elements, and means automatically operative following actuation of said initial gripping means for spreading the articulated cage so as to enclose the primary gripping means.

14. In an animal trap, the combination with animal-gripping means, of a cage operatively associated with said gripping means and normally supported in a position not obstructing said gripping means, and means automatically operative following actuation of the gripping means for shifting the cage to enclose said gripping means.

15. In an animal trap, the combination with animal-gripping elements, and means for actuating said elements, of a collapsible cage normally held in a collapsed position leaving the said gripping elements unobstructed, and means automatically operative following actuation of said gripping elements to spread the cage so as to enclose the said elements.

16. In an animal trap, the combination with animal-gripping elements, of means for actuating said elements, a spring-actuated shaft, and cage-forming elements operatively connected with said shaft, means for retaining the cage elements in an open position adjacent said gripping elements, and means automatically operative when the gripping elements are actuated to release the cage-forming elements to permit said springs to rotate the shaft carrying the said elements into cage-forming positions surrounding said gripping elements.

17. In an animal trap, the combination with animal-gripping elements, of means for actuating said elements, a spring-actuated shaft, and cage-forming elements operatively connected with said shaft, means for retaining the cage elements in an open position adjacent said gripping elements, and means automatically operative when the gripping elements are actuated to release the cage-forming elements to permit said springs to rotate the shaft carrying the said elements into cage-forming relation surrounding said gripping elements, and means for releasing said gripping elements following actuation of the cage elements.

18. In an animal trap, the combination with animal-gripping elements, of a cage automatically moved into a position enclosing said elements following actuation of the latter, and means for releasing said gripping elements following the movement of said cage to the enclosing position.

19. In an animal trap, the combination with animal-gripping and retaining means, of a pedestal therefor and adapted to be folded close against the under side thereof, a spring tending to relatively shift the said retaining means and the pedestal so that the latter is in the unfolded position, and means actuated upon initial actuation of said gripping and retaining means for retaining the pedestal in folded position.

20. In an animal trap, the combination with a pedestal member, of animal-gripping and retaining means, legs pivotally secured to the pedestal member and the said gripping and retaining means and adapted normally to assume a substantially vertical position supporting the said gripping means above the pedestal member, said arms being adapted to be turned down against the pedestal so as to depress the said gripping means, a spring tending to shift the arms to the elevated position, and means adapted for actuation following the initial actuation of said gripping and retaining means for holding the arms in the depressed position.

21. In an animal trap, the combination with animal-retaining means including a cage, of a base supporting said cage, a pedestal member, and arms connecting the pedestal member with said base and adapted to support the base in an elevated position above the pedestal, foldable means permitting depression of the base on said pedestal, resilient means for elevating the base, and animal-releasable means for retaining the base in the depressed position against the pressure of said spring.

22. In an animal trap, the combination with animal-gripping and retaining means, of a pedestal member, and means for relatively shifting said gripping and retaining means relative to the pedestal and in a substantially vertical direction, resilient means tending to retain the gripping and retaining means in an elevated position with respect to the pedestal, and means adapted for release following initial actuation of said gripping and retaining means for holding the latter in the depressed position with respect to the pedestal whereby the said resilient means is permitted to elevate the said gripping and retaining means above the pedestal.

23. In an animal trap, the combination with a base, of a plurality of independent coacting elements defining a cage adapted to overlie the base and to be folded back into an inoperative position, resilient means tending to advance the elements into the cage-defining positions, and primary animal-gripping means mounted on the base in a position to be enclosed by said cage.

24. In an animal trap, the combination with a base, of a plurality of independent coacting elements defining a cage adapted to overlie the base and to be folded back into an inoperative position, animal-gripping jaws mounted on the base in a position to be enclosed by said cage, resilient means for actuating the said cage elements and the animal-gripping jaws, and interrelated means for retaining the jaws in the set position and the cage elements in the folded back position.

25. In an animal trap, the combination with means for gripping and holding an animal, of means for enclosing the animal in a cage, and means rendered inoperative when the animal is in a position to be entirely enclosed by the cage for limiting the closing movement of the latter.

26. In an animal trap, the combination with a base, of means mounted on the base for gripping and holding an animal, normally open cage means adapted when shut to enclose the base and an animal initially gripped by said holding means, and a member normally extending transversely from the base beyond the area enclosed by the said cage and adapted when in the normal position to limit the movement of the cage into the animal-enclosing position, said member when unobstructed by said animal being adapted to shift to a position permitting full closing of the cage.

27. In an animal trap for taking animals alive, the combination with a cage or container for confining the trapped animal, said cage being movable from an initial to an elevated position, of means for elevating the confined animal and the cage from the initial to the elevated position.

28. In an animal trap, the combination with caging elements, of means for actuating said elements to confine the animal, and means automatically operative in the actuation of said caging elements for elevating the cage and the confined animal bodily to an elevated position.

WALTER A. GIBBS.